Jan. 28, 1930.  W. DALTON  1,745,153
RAILWAY TRUCK WHEEL AND WHEEL AND AXLE ASSEMBLY

Filed March 30, 1929

Inventor:
William Dalton,
by Charles E. Tullar
His Attorney.

Patented Jan. 28, 1930

1,745,153

UNITED STATES PATENT OFFICE

WILLIAM DALTON, OF GLENVILLE, NEW YORK, ASSIGNOR TO GENERAL ELECTRIC COMPANY, A CORPORATION OF NEW YORK

RAILWAY TRUCK WHEEL AND WHEEL AND AXLE ASSEMBLY

Application filed March 30, 1929. Serial No. 351,343.

The present invention relates to railway truck wheels and to wheel and axle assemblies, particularly wheel and axle assemblies for railway rolling stock.

According to my invention I provide an assembly of an axle, a dished plate web and a tire secured together by any suitable process of fusion of metal. By this construction the tire and web may be lightened and made of the material best adapted for its particular use.

This construction possesses advantages over the standard type of railway truck assemblies which comprise an integral wheel of which the tire, web and hub are of wrought steel, said wheel being adapted to be keyed to an axle, in that the present assembly may be made cheaper, lighter and of easily replaceable parts.

Figure 1:
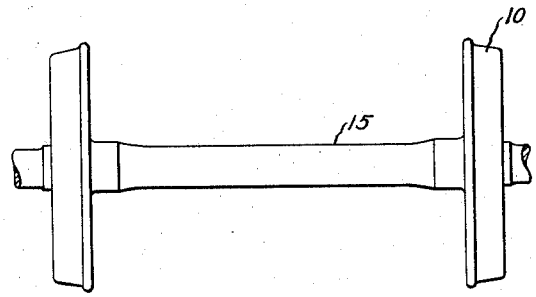
Figure 2:
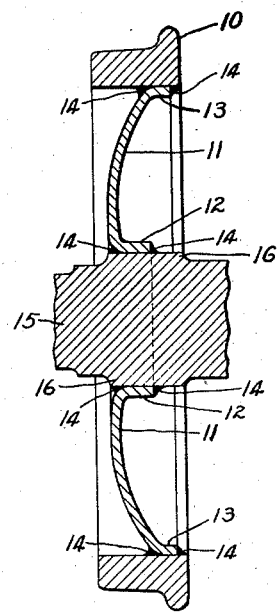

In the drawing, Fig. 1 is a face view of a wheel and axle assembly in accordance with my invention, and Fig. 2 is a central sectional view of the assembled wheel and a portion of the axle.

Referring to the drawing, 10 represents a tire, preferably of rolled steel. A dished plate web 11 having inner and outer flanges 12 and 13 is welded or otherwise secured to the tire 10 and an axle 15 by any desired process of fusion of metal at circumferences 14. The axle 15 has an enlarged periphery at 16 on which the web is adapted to make a shrink fit.

The parts are assembled by first heating the web 11 and pressing it on the axle 15 while hot. When these parts are cool the tire 10 is heated and pressed on the web 11. The connections 14 are then made by metal fusion.

The enlarged portion 16 is provided on axle 15 to prevent weakening the axle. Welding, for example, weakens the metal at the weld. The enlarged portion is thick enough so that the affected part of the metal does not extend to the axle proper. The larger periphery also provides a greater welding area than the normal sized axle would afford.

The dished plate web 11 is preferably constructed of sheet steel by pressing. This web, when shaped, costs less than one third the amount required for a cast web of the same strength and requires less material. The flange 12 is much lighter than the cast hub of standard type. The welded connection of the web 11 and axle 15 does away with the key and keyway construction.

A further advantage results from the dished plate web in that due to its shape it may spring slightly to allow the outer rim to expand with the tire. The tire becomes hot in use, especially when brakes are applied thereto for any considerable time. This heat would be sufficient to expand the tire enough to pull it away from a flat plate and break the welded connection.

The tire is preferably made of rolled steel since such a wheel has very good wear resisting qualities.

The tire is subjected to the greatest wear, the axle a lesser amount, and the web practically none. It is therefore desirable to make the parts replaceable. In the present construction an assembly having worn parts may be placed in a lathe, the welds cut away and the parts disassembled by pressing operations. New parts may then be assembled with the unworn parts as in the original assembling.

What I claim as new and desire to secure by Letters Patent of the United States, is:

1. In a wheel and axle assembly for railway rolling stock the combination of an axle, a tire, and a connecting dished plate web having inner and outer flanges, said flanges being fitted and fastened to the axle and tire.

2. In a wheel and axle assembly for railway rolling stock the combination of an axle, an enlarged portion on said axle, a tire, and a connecting dished plate web having inner and outer flanges, said flanges being fitted and welded to the tire and to the enlarged portion on said axle.

3. As an article of manufacture a railway truck wheel comprising a dished plate web having inner and outer flanges, a tire, and means for fastening said tire to said outer flange.

4. As an article of manufacture a railway truck wheel comprising a dished plate web having inner and outer flanges, a tire, said inner flange forming a hub for the accommodation of an axle, and means for fastening said tire to said outer flange.

In witness whereof, I have hereunto set my hand this 29th day of March, 1929.

WILLIAM DALTON.